Aug. 5, 1952
M. DARCISSAC
2,605,546
ARTIFICIAL DENTURE MOUNTING
Filed July 9, 1948
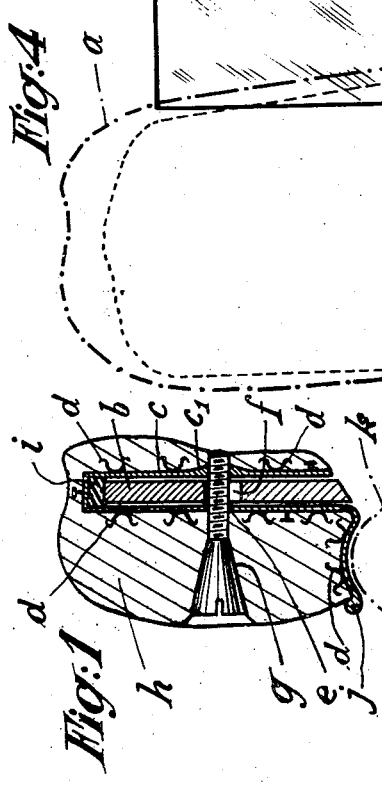
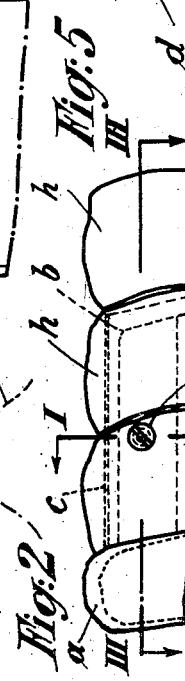
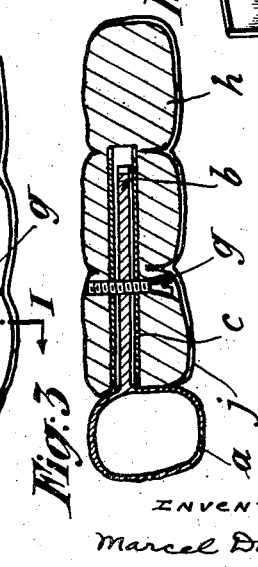
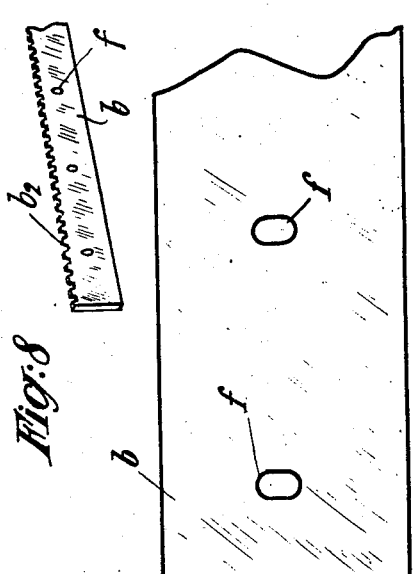
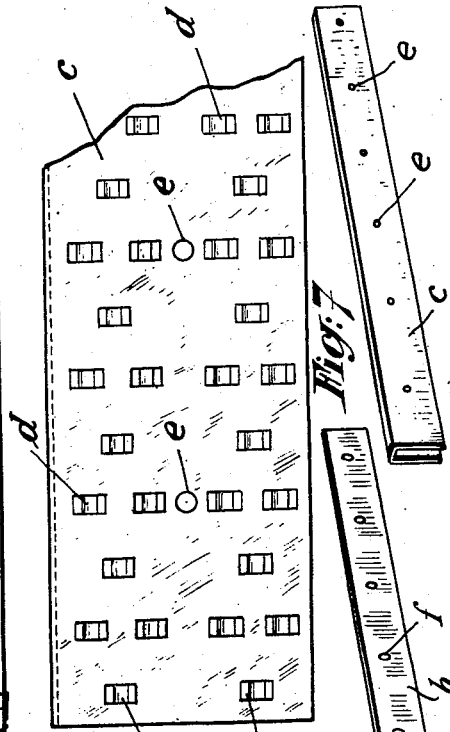
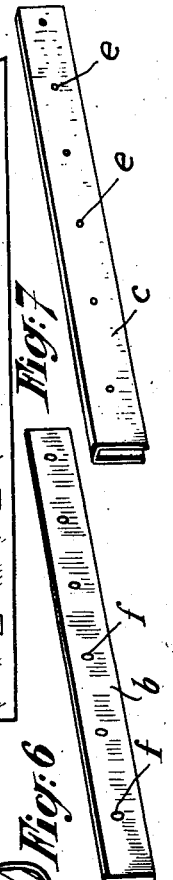
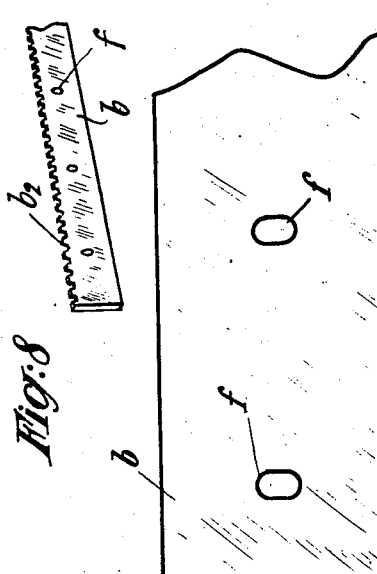
INVENTOR
Marcel Darcissac
By Watson, Cole, Grindle & Watson Patented Aug. 5, 1952

2,605,546

UNITED STATES PATENT OFFICE 2,605,546

ARTIFICIAL DENTURE MOUNTING

Marcel Darcissac, Paris, France

Application July 9, 1948, Serial No. 37,768
In France December 26, 1947

3 Claims. (Cl. 32—6)

The employment of fixed artificial dental prostheses or replacements, that alone enable a complete operative substitution to be obtained, was frequently limited up till now through the lack of an entire set of molars, either on a single side, or on both sides of the dental arch; that involved a more or less extensive fitting to the fixed bridge, according to the number of remaining anchor teeth, of a movable artificial plate with all its disadvantages.

The object of the present invention is to provide an improved dental prosthetic apparatus comprising an artificial denture removably mounted on a supporting member rigidly secured to the remaining anchor tooth or teeth and fitted up so that the artificial denture is held in position on the crest or ridge of the alveolar surface, with a certain amount of freedom, while the slight comparative movements of the artificial teeth in relation to the supporting member during the mastication of food are suitably cushioned. It will be realised that, with the artificial denture thus set up in an independent way, there is no force applied to the supporting member of the artificial teeth during mastication.

According to an embodiment of my invention, the anchor member or fixed part of the bridge is provided with an extension or cantilever bar, over which is fitted a U-shaped piece that acts as a support for the artificial teeth; a transverse screw passing through an oval-shaped hole in the bar ensures the holding in position of the U-shaped member, while allowing it comparative slight movements. A rubber strip is provided between the inner surface of the bar and the bottom of the U-shaped member to ensure the damping of these movements.

The following disclosure in reference to the accompanying drawings, that are given merely as an example, will provide a clear understanding of the way in which the invention may be carried out.

Fig. 1 is a cross section, on a large scale, of the prosthetical apparatus, taken on the line I—I of Fig. 2.

Fig. 2 is a side view of the bridge.

Fig. 3 is a horizontal section taken on the line III—III of Fig. 2.

Figs. 4 and 5 are side elevations of the bar and U-shaped member on the scale of Fig. 1.

Fig. 6 is a perspective view, on a full size scale, of a strip with oval-shaped holes intended to be divided up by the practitioner for forming several supporting bars of required length.

Fig. 7 is a similar view of a U-shaped strip.

Fig. 8 is a modification of Fig. 6.

As may be seen in Fig. 1, the cushioned prosthetic apparatus comprises a support $a$ such as a metal crown encasing the last tooth of the arch which serves as an anchor tooth for the apparatus, the support having rigidly secured thereto a rigid bar of metal $b$. Astride said bar is fitted, with a certain amount of play, a U-shaped piece or member $c$ that carries the artificial teeth, the latter being preferably of synthetic resin and moulded on the U-shaped member. The holding in position of the teeth $h$ is ensured by anchor projections $d$ provided on the outer surfaces of the U-shaped piece $c$. The member $c$ is pierced with round holes $e$ while the bar $b$ is drilled with oval-shaped holes $f$, the space between the holes being the same on the bar and the U-shaped member; under these conditions, a loose connection of the bar to the U-shaped member may be ensured by a transverse screw $g$ that passes freely through the hole $e$ of the left leg (see Fig. 1) of the U-shaped member as well as the corresponding oval-shaped hole $f$ of the bar $b$ and finally is screwed through its end in a boss $c'$ of the right leg of the member $c$, provided with a suitably threaded hole. As will be noted in Fig. 1, the tapered head of the screw fits into a corresponding housing of the artificial tooth $h$.

In the bottom of the U-shaped member $c$ is fitted a strip of rubber $i$ that prevents a swinging to and fro of the artificial denture and normally maintains the latter out of contact with the alveolar surface ridge; the root surface of the artificial teeth may be bounded by a side extension $j$ of metal, fast with the lower edge of the left leg of the U-shaped member, and having an outer surface shaped to be complementary to the surface of the alveolar ridge $k$. Said extension presses during mastication against the surface of the alveolar ridge $k$.

It will be realised that owing to the existence of the oval-shaped holes $f$ and of the rubber strip $i$, the artificial denture assembly constituted by the U-shaped member and the artificial teeth, is completely independent and that it may assume during mastication slight comparative translational or swinging movements in the vertical direction, or possibly translational movements in the lateral direction, without any force reacting on the bar $b$ or on the anchor tooth, the stresses being absorbed by the alveolar surface ridge. Moreover, it will be realised that the movements of the artificial denture assembly in relation to the bar and the anchor tooth are cushioned.

In order to ensure that the rubber strip is properly held in the bottom of the cradle, it will prove of benefit to provide on the upper edge of the bar striations, corrugations, notches, etc., as shown in Fig. 8.

Alterations, naturally, may be introduced in the device that has been disclosed, more particularly by substituting equivalent technical means, without unduly widening the scope of the invention as defined in accompanying claims. The rubber strip especially, might be replaced by a spring blade or other elastic device.

What I claim is:

1. In an artificial denture mounting the combination of a rigid bar having a transverse aperture therethrough elongated along the height of said bar; a U-section rigid member having a transverse aperture therethrough, adapted to be placed astride said bar and having such cross section dimensions that the car can move inwardly and outwardly with a sliding fit therein; a side extension fast with said rigid member at the outer end of one of the legs of said U, said extension having an outer surface shaped to be complementary to the surface of a jaw alveolar ridge; a resilient cushion in the bottom of the U provided by said rigid member yieldingly to restrict relative inward movement of said bar with respect to said rigid member; and transfixing means fast with said rigid member, passing with clearance through said aperture in said rigid bar for retaining the U-section rigid member on the bar.

2. In an artificial denture mounting, the combination of a rigid bar having a transverse aperture therethrough elongated along the height of said bar and being adapted to be secured by one of its ends only to an abutment tooth; a U-section rigid member having a transverse aperture therethrough, adapted to be placed astride said bar and having such cross-section dimensions that the bar can move inwardly and outwardly with a sliding fit therein; a side extension fast with said rigid member at the outer end of one of the legs of said U, said extension having an outer surface shaped to be complementary to the surface of a jaw alveolar ridge; a resilient cushion in the bottom of the U provided by said rigid member yieldingly to restrict relative inward movement of said bar with respect to said rigid member; and transfixing means fast with said rigid member, passing with clearance through said aperture in said rigid bar for retaining the U-section rigid member on the bar.

3. In an artificial denture mounting the combination of a rigid bar having a transverse aperture therethrough elongated along the height of said bar, a U-section rigid member having a transverse aperture therethrough, adapted to be placed astride said bar and having such cross-section dimensions that the bar can move inwardly and outwardly with a sliding fit therein, a resilient cushion in the bottom of the U provided by said rigid member yieldingly to restrict relative inward movement of said bar with respect to said rigid member, and transfixing means fast with said rigid member, passing with clearance through said aperture in said rigid bar for retaining the U-section rigid member on the bar.

MARCEL DARCISSAC.

REFERENCES CITED

The following references are of record in the file of this patent:

UNITED STATES PATENTS

| Number | Name | Date |
| --- | --- | --- |
| 601,703 | Chaffin | Apr. 5, 1898 |
| 1,324,476 | Supplee | Dec. 9, 1919 |
| 2,002,048 | Thomas | May 21, 1935 |